US010652082B2

(12) United States Patent
Hudson et al.

(10) Patent No.: US 10,652,082 B2
(45) Date of Patent: May 12, 2020

(54) AUTOMATED DETECTION OF COMMUNICATIONAL SYSTEM TYPE (71) Applicant: IXI Technology, Yorba Linda, CA (US)

(72) Inventors: Kevin Hudson, Corona, CA (US); Jin Qiao, Yorba Linda, CA (US)

(73) Assignee: IXI Technology, Yorba Linda, CA (US)

( * ) Notice: Subject to any disclaimer, the term of this patent is extended or adjusted under 35 U.S.C. 154(b) by 87 days.

(21) Appl. No.: 15/045,222

(22) Filed: Feb. 16, 2016

(65) Prior Publication Data
US 2017/0237610 A1 Aug. 17, 2017

(51) Int. Cl.
H04L 12/24 (2006.01)
G06F 13/42 (2006.01)
(Continued)

(52) U.S. Cl.
CPC ........ H04L 41/0806 (2013.01); G06F 13/385 (2013.01); G06F 13/387 (2013.01);
(Continued)

(58) Field of Classification Search
CPC ............... G06F 13/387; G06F 13/4252; G06F 13/4286; G06F 13/42; G06F 13/385;
(Continued)

(56) References Cited

U.S. PATENT DOCUMENTS 5,646,865 A * 7/1997 Alfaro ................. G05B 19/048
701/32.7
5,687,174 A * 11/1997 Edem ...................... H04L 12/44
370/446

(Continued)

OTHER PUBLICATIONS

Get Engineering, "A General Discussion of the MIL-STD-1397C ( Navy) NTDS Interface Standard and the MIL-STD-188-203-1A ( D2 ) ATDS Serial Interface Standard", Jun. 6, 2005, v 1.08, http://web.archive.org/web/20140710015646/http://www.getntds.com/pdf/GET_Tutorial.pdf, pp. 1-55.*

(Continued)

Primary Examiner — Gregory G Todd
(74) Attorney, Agent, or Firm — The Watson IP Group PLC; Jovan N. Jovanovic; Vladan M. Vasiljevic (57) ABSTRACT To provide greater efficiency in connecting and establishing communicational equipment, the communicational system type can be automatically detected and the communicational equipment can configure itself in accordance with the automatically detected communicational type. Additionally, to accommodate dynamic reconfiguration, or changes to the communicational type after an initial configuration, the communicational type can be automatically monitored and the communicationally equipment automatically reconfigured if changes are detected. Different sets of comparator circuitry can be utilized to compare the voltages observed at known inputs to known thresholds of different communicational types to automatically detect the communicational type being utilized by existing equipment to which the newly-connected equipment is communicationally coupled. For efficiency, already existing circuitry for converting electrical voltages into digital data can be leveraged to monitor and automatically detect the communicational type being utilized.

11 Claims, 4 Drawing Sheets (51) Int. Cl.
*G06F 13/38* (2006.01)
*H04L 12/40* (2006.01)

(52) U.S. Cl.
CPC ........ *G06F 13/42* (2013.01); *G06F 13/4286* (2013.01); *H04L 12/40136* (2013.01)

(58) Field of Classification Search
CPC ............ G05B 1/03; G05B 2219/25217; H04L 41/0806; H04L 12/40136
See application file for complete search history.

(56) References Cited

U.S. PATENT DOCUMENTS

| | | | | |
|---|---|---|---|---|
| 5,883,528 A * | 3/1999 | Kashmiri | ....... | H03K 19/018585 326/34 |
| 6,262,679 B1 * | 7/2001 | Tran | .................. | G01S 13/9303 342/29 |
| 8,390,150 B2 * | 3/2013 | Vande Vusse | ..... | G05B 19/0423 307/112 |
| 9,634,447 B1 * | 4/2017 | Neil | ....................... | H01R 31/06 |
| 2003/0199266 A1 * | 10/2003 | Zavidniak | .......... | H04M 1/72511 455/410 |
| 2006/0024056 A1 * | 2/2006 | Erisman | ................ | H04L 49/254 398/45 |
| 2009/0097391 A1 * | 4/2009 | Diab | ................. | H04L 12/40136 370/201 |
| 2014/0300770 A1 * | 10/2014 | Izukawa | ............ | H04N 5/23241 348/222.1 |
| 2015/0326999 A1 * | 11/2015 | Foesser | ............... | H04L 41/0809 455/41.1 |
| 2017/0237610 A1 * | 8/2017 | Hudson | ............... | H04L 41/0806 709/220 |

OTHER PUBLICATIONS

Sosinsky, Barrie, Networking Bible, Aug. 13, 2009, Wiley & Sons, https://books.google.conn/books?id=3DOREqRZejcC, pp. 163-165. (Year: 2009).*

* cited by examiner

AUTOMATED DETECTION OF COMMUNICATIONAL SYSTEM TYPE

BACKGROUND

Existing communicational cabling can carry communicational signals of many different types and protocols depending on the capabilities and configurations of the communicational equipment connected to such wiring. The communicational signals can be in the form of the presence or absence of specific, predefined electrical voltages. Depending on the type or protocol of the communication, different predefined electrical voltages can be utilized to convey data or information, including binary data. In some instances, it can be difficult to tell, from the wiring connectors themselves, what communicational signaling type equipment on the other end of such wiring utilizes, instead requiring manual evaluation and configuration of the communicational equipment.

SUMMARY

To provide greater efficiency in connecting and establishing communicational equipment, the communicational system type can be automatically detected and the communicational equipment can configure itself in accordance with the automatically detected communicational type. Additionally, to accommodate dynamic reconfiguration, or changes to the communicational type after an initial configuration, the communicational type can be automatically monitored and the communicationally equipment automatically reconfigured if changes are detected. Different sets of comparator circuitry can be utilized to compare the voltages observed at known inputs to known thresholds of different communicational types to automatically detect the communicational type being utilized by existing equipment to which the newly-connected equipment is communicationally coupled. For efficiency, already existing circuitry for converting electrical voltages into digital data can be leveraged to monitor and automatically detect the communicational type being utilized.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to automatic detection of the communicational type being utilized to transmit communications through cabling, and the automatic configuration of communicational type settings of a communicational device newly-connected to such cabling. To provide greater efficiency in connecting and establishing communicational equipment, the communicational type can be automatically detected and the communicational equipment can be automatically configured in accordance with the automatically detected communicational system type. Additionally, should the communicational type change, the communicational type can be automatically monitored and the communicationally equipment automatically reconfigured. Different sets of comparator circuitry can be utilized to compare the voltages observed at known inputs to known thresholds of different communicational types to automatically detect the communicational type being utilized by existing equipment to which the newly-connected equipment is communicationally coupled. For efficiency, already existing circuitry for converting electrical voltages into digital data can be leveraged to monitor and automatically detect the communicational type being utilized The descriptions below are provided within the context of the automatic detection and automatic configuration as between different communicational types conforming to the Naval Tactical Data System (NTDS) specifications. However, such references are only exemplary and are provided only for clarity of description and not as an explicit limit on the scope of the mechanisms described herein. To the contrary, the mechanisms described herein are equally applicable to the automatic detection and automatic configuration as between any different communicational types differing between themselves in manners analogous to that described herein with reference to the NDTS communicational types.

Additionally, the description below will make reference to processor-performed functionality, computer-executable instructions and the like. As such, it will be understood that such acts and operations, which are at times referred to as being computer-executed, or processor-performed include the manipulation, by one or more processing units, of electrical signals representing data in a structured form. This manipulation transforms the data or maintains it at locations in memory, which reconfigures or otherwise alters the operation of the processing units or peripherals in a manner well understood by those skilled in the art. The data structures where data is maintained are physical locations that have particular properties defined by the format of the data.

Figure 1:
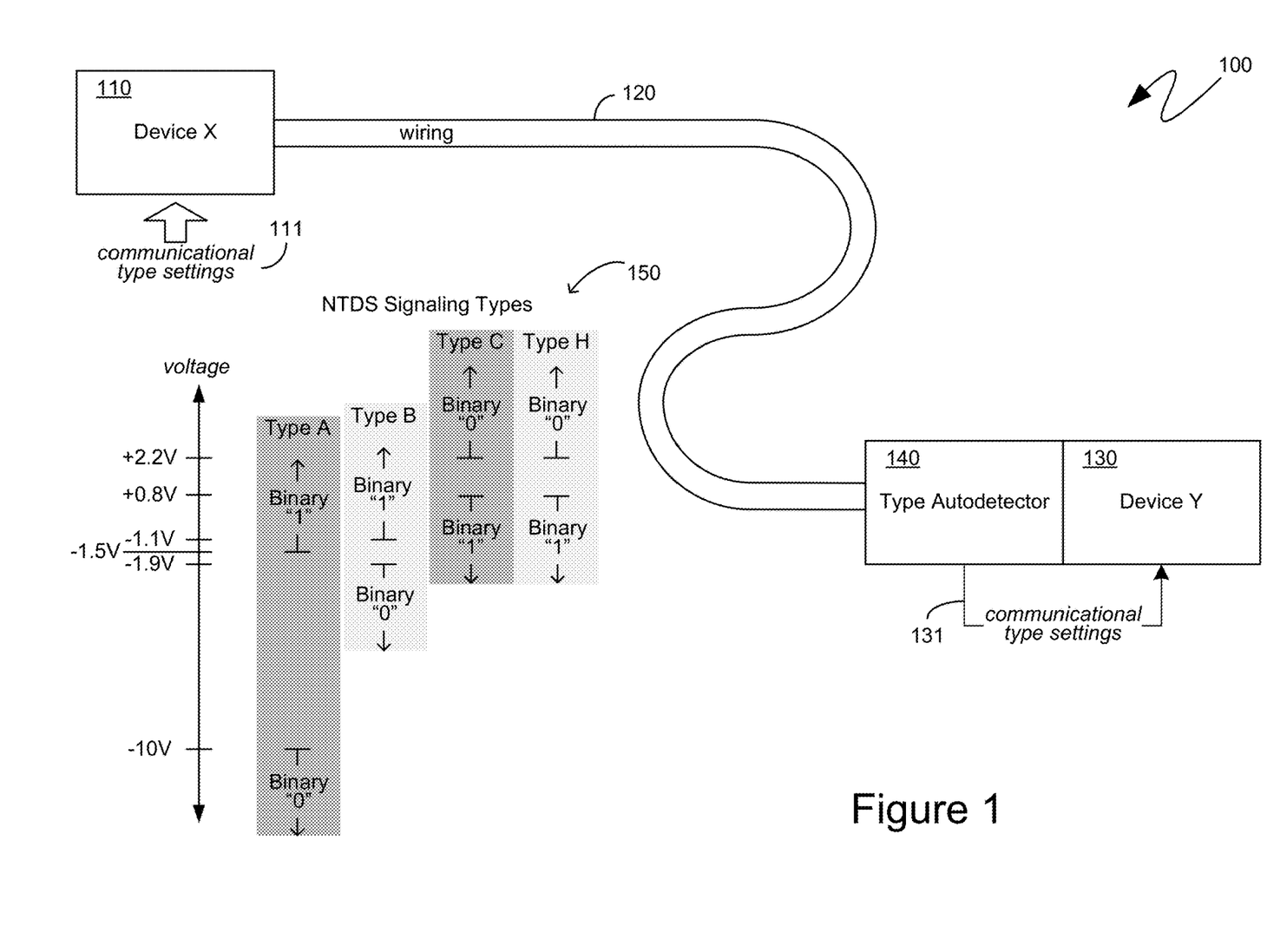
FIG. 1 is a block diagram of an exemplary communicational system.

With reference to FIG. 1, an exemplary system 100 is illustrated, providing context for the descriptions below. The exemplary system 100 of FIG. 1 is shown as comprising two different communicational devices, namely the exemplary communicational device 110 and the exemplary communicational device 130, communicating through cabling or wiring 120 that communicationally couples the device 110 to the device 130. According to one aspect, the device 110 can be configured to use communicational settings 111, with which the device can communicate through the wiring 120 by adjusting the voltages on various individual wires, channels, or other like communicational pathways. For example, the device 110 can be configured to utilize one of the NTDS types 150. By way of a specific example, if the device 110 was configured to utilize NTDS Type A, a voltage setting on an individual wire, of the wiring 120, of greater than −1.5V can be indicative of a binary "1" value, while a voltage setting of less than −10V can be indicative of a binary "0" value.

In order for the device 130 to communicate with the device 110, the device 130 can be configured to utilize the same communicational type. For example, the device 130 can be configured to utilize NTDS Type A, such that the device 130 would interpret voltages greater than −1.5V to be indicative of a binary "1" value, and voltages of less than −10V to be indicative of a binary "0" value. As can be seen from the NTDS types 150, should the device 130 be configured to utilize a different NTDS type, communications from the device 110 will not be received properly. For example, if the device 130 was configured to utilize NTDS Type C, then the device 130 would interpret as a binary "1" value a voltage of −2V, while the device 110, utilizing NTDS Type B, would have established such a voltage on a wire of the wiring 120 as a transmission of a binary "0". As will be recognized by those skilled in the art, such a misinterpretation can detrimentally affect communication between the device 110 and the device 130.

Consequently, according to one aspect, an autodetector, such as the exemplary autodetector 140, can automatically detect the communicational type being utilized by a device, such as the exemplary device 110, which is communicationally coupled to the device 130 through the wiring 120. Upon automatically detecting the communicational type being utilized by the exemplary device 110, the autodetector 140 can set the communicational type settings 131 of the device 130. Although illustrated as separate from the device 130, the autodetector 140 can be integrated therewith or be a separately connectable component. Additionally, and as will be described further below, detection of the communicational type, by the autodetector 140, can occur prior to normal communicational operation such that the state of the other communicating device is known. For example, the other communicating device can, according to some communicational specifications, transmit only binary "0" values on specific communicational pathways until normal operation commences.

Figure 2:
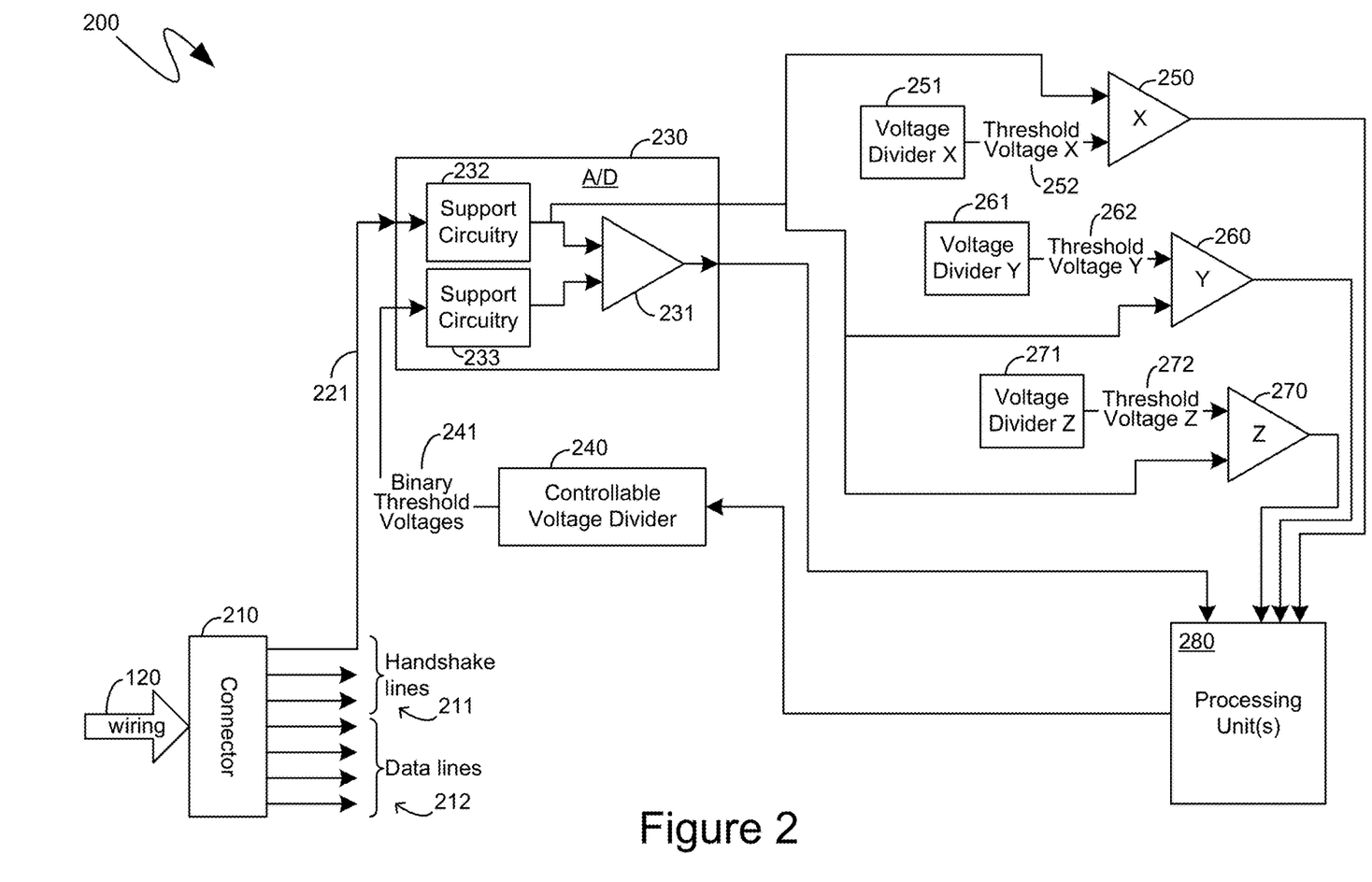
FIG. 2 is a block diagram of an exemplary communicational type autodetection device.

Turning to FIG. 2, the system 200 shown therein illustrates exemplary componentry of an exemplary autodetector, such as the exemplary autodetector 140 shown in FIG. 1. In the system 200 of FIG. 2, the wiring 120 can be physically connected, such as to the rest of the system 200, through a connector 210. According to one aspect, the wiring 120 can couple, to the connector 210, individual wires, some of which can carry data signals, such as the exemplary data lines 212, while others can carry handshaking information, such as the exemplary handshake lines 211. As will be recognized by those skilled in the art, the wiring 120, and the exemplary handshake lines 211 and exemplary data lines 212, can be part of a parallel communicational connection. Although described by reference to such a parallel communicational connection, the mechanisms and systems described herein are equally applicable to serial communication connections and other types of communicational connections.

According to one aspect, the communicational signals transmitted through the wiring 120, such as in the form of established voltages that are greater than or less than predetermined thresholds, can be converted to digital signals through analog-to-digital converters, such as the exemplary analog-to-digital converter 230. As will be recognized by those skilled in the art, the exemplary analog-to-digital converter 230 can comprise a comparator 231 that can compare an observed voltage, such as on one or more of the handshake lines 211, or data lines 212, to a predetermined threshold voltage, and can, correspondingly, output a binary "1" or binary "0", which can then be provided to further digital processing componentry. A predetermined threshold voltage, to which the comparator 231 can compare an observed voltage, can be provided, such as by a controllable voltage divider 240, which can provide the binary threshold voltages 241, such as in the manner detailed further below.

As will also be recognized by those skilled in the art, depending on the comparator 231 utilized, support circuitry 232 and 233 can be utilized to, for example, implement voltage divider circuitry, noise reduction circuitry, filtering, grounding, and other like support functionality to facilitate the operation of the comparator 231. For example, the voltages observed on the handshake line 221, which is fed into the analog-to-digital converter 230, can have a greater range than the capability of the comparator 231. In such an instance, the support circuitry 232 can reduce that voltage range, such as through a voltage divider circuit or other like mechanism. Support circuitry 233 can implement similar functionality, or other like support functionality.

According to one aspect, each of the individual handshake lines 211, such as the exemplary handshake line 221, as well as each of the data lines 212, can be provided to their own analog-to-digital converter, such as the exemplary analog-to-digital converter 230, whose output can then be provided to digital processing units, such as the exemplary processing units 280. The processing units 280 can be any digital processing device including, for example, central processing units (CPUs), graphics processing units (GPUs), field programmable gate arrays (FPGAs), and other processing units. For purposes of implementing automatic detection of communicational system types, it can be sufficient to monitor only a single communicational line, such as the exemplary handshake line 221. For example, within the context of NTDS, it can be sufficient to monitor the EIR handshake input. Other handshake inputs can also be monitored, either as alternatives, or in addition to provide for more accurate detection of communicational types, noise rejection, false positive detection, greater redundancy, and other like benefits. Within the context of NTDS, other handshake inputs that can be monitored include the ODR, EFR and IDR handshake inputs.

To monitor, and automatically detect, the communicational system type, existing analog-to-digital converters, such as the exemplary analog-to-digital converter 230, can be utilized to obtain therefrom the handshake line 221 after having passed through any support circuitry, such as exemplary support circuitry 232. In such a manner, the useful functionality of the support circuitry 232, such as to bring the voltages observed on the handshake line 221 within the range of the comparator 231, can be leveraged without introducing redundant componentry and increased cost. Alternatively, or in addition, handshake lines, such as exemplary handshake line 221, can be fed directly to various comparators, such as exemplary comparators 250, 260 and 270, instead of being tapped from within an analog-to-digital converter.

Each of the comparators 250, 260 and 270 can compare the voltage observed on the handshake line 221, or some multiple or fraction of such voltage, to a threshold voltage, such as the exemplary threshold voltages 252, 262 and 272, which can be established by voltage divider circuitry, such as the exemplary voltage divider circuitry 251, 261 and 271, in a manner well known to those skilled in the art. For example, within the context of NTDS, different voltage ranges can be utilized by different types of NTDS, and can, thereby, allow differentiation therebetweeen, including automatic detection of the NTDS type being utilized. By way of a specific example, detection of voltages below a threshold, such as, for example, below −10V, when the binary data expected is a binary "0" value, can be indicative of the utilization of NTDS Type A. Consequently, a comparator, such as the exemplary comparator 260, can be provided with a threshold voltage 262 between −10V and −1.9V, which can represent a threshold associated with a different communicational type, such as, for example, within the context of NTDS, an NTDS Type B communicational type. As a specific example, the threshold voltage 262 can be −8V. Alternatively, if, as illustrated in FIG. 2, the exemplary handshake line 221 is tapped within the analog-to-digital converter 230 and is being fed to the exemplary comparator 260 after the voltage on such a handshake line has been altered in accordance with the support circuitry 232, the exemplary threshold voltage 262 can be a reduced value. For example, if support circuitry 232 reduced the voltage range of the input received at the exemplary handshake line 221 such that a threshold value of −10V was reduced to a threshold value of −1.75V, then the exemplary threshold voltage 262 can be set to −1.05V, such as by the exemplary voltage divider circuitry 261.

Returning to the operation of the exemplary comparator 260, if the voltage observed on the handshake line 221 is less than the threshold voltage 262, then the exemplary comparator 260 can output a binary "1". Such a binary "1" being output by the exemplary comparator 260 can be indicative of detection of an NTDS Type A device being communicationally coupled through the wiring 120.

As another specific example, detection of voltages below 0.8V, again when a binary value of "0" is expected, can be simultaneously indicative of both NTDS Type A and NTDS Type B. Thus, for example, if a comparator, such as the exemplary comparator 270, was provided with a threshold voltage 272, from the exemplary voltage divider 271, of between 0.8V and −1.9V, such as, for example, −0.5V, then, if the voltage observed on the handshake line 221 is less than such a threshold voltage 272, the exemplary comparator 270 can output a binary "1". Such a binary "1" being output by the exemplary comparator 270 can be simultaneously indicative of both NTDS Type A and NTDS Type B. However, in combination with the output of the exemplary comparator 260, a differentiation can be made between the two. More specifically, if the exemplary comparators 260 and 270 are both outputting a binary "1", then the device communicating through the wiring 120 can be automatically determined to be utilizing NTDS Type A, while, as another example, if the exemplary comparator 270 is outputting the aforementioned binary "1", but the exemplary comparator 260 is outputting a binary "0", then the device communicating through the wiring 120 can be automatically determined to be utilizing NTDS Type B. As detailed above, the exemplary threshold voltage 272 being established by the exemplary voltage divider circuit 271 can be in accordance with the range of voltages specified by various communicational types, such as a voltage that can differentiate between, for example, NTDS Types A and B on the one hand and NDTS Types C and H on the other. Additionally, as also detailed above, the exemplary threshold voltage 272 can established by the exemplary voltage divider circuit 271 in accordance with whatever voltage adjustment is performed by the support circuitry 232, if the exemplary handshake line 221 is being provided to the exemplary comparator 270 from a point after the support circuitry 232 of the analog-to-digital converter 230.

Continuing with the illustrative example of automatically detecting and differentiating between various NTDS types, as can be seen from the exemplary NTDS voltage ranges shown in FIG. 1, voltages above 2.2V, when a binary value of "0" is expected, can be indicative of NTDS Type C or NTDS Type H. In the present, illustrative, example, since both NTDS Type C and NTDS Type H utilize the same voltage thresholds, there may not be a need to distinguish further between them, since setting a device to communicate utilizing NTDS Type C can result in the device interpreting received voltages, and generating responsive voltages, in an equivalent manner to a device communicating utilizing NTDS Type H. Thus, in such an example, the comparator 250 can be configured to compare the voltages observed on the exemplary handshake line 221 to a threshold voltage 252 set between, for example, 0.8V and 2.2V, such as, for example, +1.0V. If the voltage observed on the exemplary handshake line 221 is greater than the threshold voltage 252, then the comparator 250 can output a binary "1", since the exemplary handshake line 221 is being fed into the positive input of the exemplary comparator 250, as shown, instead of the negative input, as is shown, and as was described, for the exemplary comparators 260 and 270. Such a binary "1" output of the exemplary comparator 250, configured in the manner shown in FIG. 2, can be indicative of a device communicating through the wiring 120 utilizing NTDS Type C or NTDS Type H. Again, as before, the exemplary voltage threshold 252 can be set in accordance with voltage ranges specified by the various communicational specifications, as further modified by the support circuitry 232, if appropriate.

In the present, illustrative example, the comparator 250 can be optional. More specifically, and as explained in detail above, the exemplary comparator 260 can be configured, such as with the threshold voltage 261, to detect NTDS Types A and B. As such, the binary opposite output of the exemplary comparator 260 can be used to detect NDTS Types C and H. For example, and as detailed above, the exemplary threshold voltage 262 can be configured, such as by the voltage divider 261, to provide such a voltage to the exemplary comparator 260 such that, when a binary "0" is received according to NTDS Type A or NTDS Type B, the output of the exemplary comparator 260 will be a binary "1". Conversely, therefore, if the output of the exemplary comparator 260 will be a binary "0", by process of elimination, it can be determined that NTDS Type C or NTDS Type H communications are being detected. The exemplary comparator 250, therefore, according to one aspect, can be optional. However, the exemplary comparator 250 can provide redundancy, error detection, and other like supportive functionality. More specifically, the above-mentioned "process of elimination" can be based on error-free conditions, since, in the presence of errors, those errors, rather than the presence of communications conforming to NTDS Type C or NTDS Type H can also explain the receipt of the binary "0" from the exemplary comparator 260. Consequently, the presence of the exemplary comparator 250 can detect such error conditions, including, for example, when a communicating device is not powered on.

As illustrated by the exemplary system 200 of FIG. 2, the outputs of the various comparators, such as exemplary comparators 250, 260 and 270, can be provided to the processing units 280 for interpretation, such as in accordance with the descriptions above. Thus, for example, the processing units 280 can detect that the output of the exemplary comparator 270 is a binary "1", that the output of the exemplary comparator 260 is a binary "0", and, accordingly, the processing units 280 can determine, based on such comparator output, that the communicational type being utilized is NTDS Type B. Based on such a determination, the processing units can then control the controllable voltage divider 240 to establish appropriate binary threshold voltages 241 to be provided to the analog-to-digital converter 230 in order to properly convert the voltages observed on the handshake lines 211 and data lines 212 into binary values. For example, if the processing units 280 determine, based on the outputs of the comparators, such as detailed above, that a device, communicationally coupled through the wiring 120, is utilizing NTDS Type B, then the processing units 280 can control the controllable voltage divider 240 to establish binary threshold voltages such that voltages below −1.9V are interpreted as a binary "0" value, and voltages above −1.1V are interpreted as a binary "1" value. As illustrated, such binary threshold voltages can then be provided to various analog-to-digital converters, such as the exemplary analog-to-digital converter 230. In such a manner, the communicational type being utilized by a device that is communicationally coupled through the wiring 120 can be automatically detected and established without the need for manual intervention.

Figure 3:
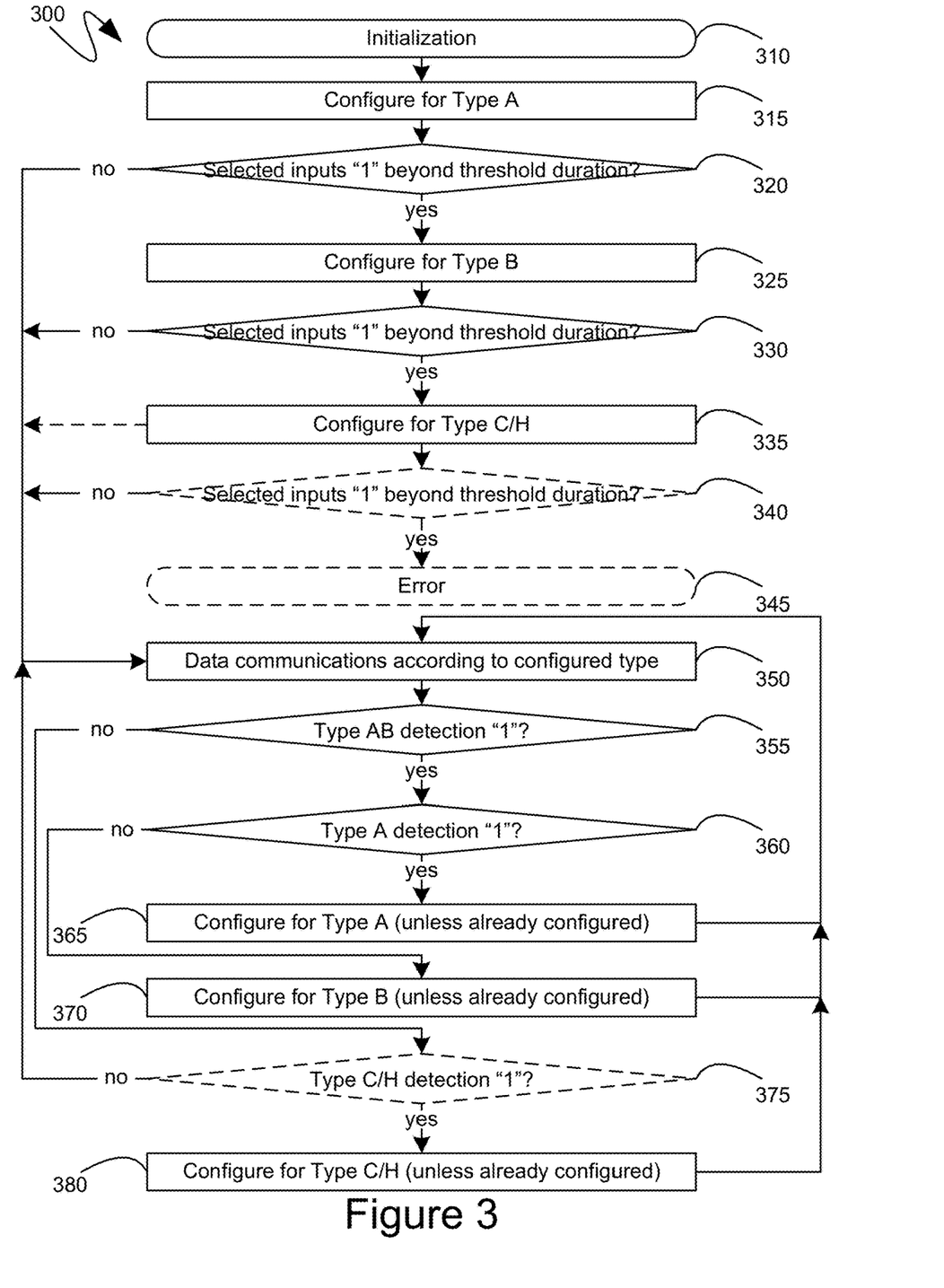
FIG. 3 is a flow diagram of an exemplary communicational type autodetection mechanism.

Turning to FIG. 3, the exemplary flow diagram 300 shown therein illustrates an exemplary series of steps by which a communicational device can be automatically configured to utilize a predetermined communicational type, and the communicational type of other devices to which that device is communicationally coupled can be automatically monitored and the communicational type being utilized can be automatically changed should the communication type change, such as if other devices are disconnected and replaced by different devices utilizing a different communicational type.

As illustrated in FIG. 3, after an initialization step 310, a communicational device can be configured, at step 315, to communicate utilizing a specific communicational type as a default, such as, for example, a communicational type having the lowest voltage thresholds for distinguishing between a binary "0" and a binary "1". Subsequently, after configuring the device for specific communicational type at step 315, such as, in the present example, for NTDS Type A, an observation can be made of selected inputs. According to one aspect, an assumption can be made that the voltages initially observed on such inputs should be binary "0". For example, and as indicated previously, various communicational specifications require compliant devices to output voltages conforming to binary "0" values after initialization until a handshaking has been performed to establish subsequent communication. However, as will be recognized by those skilled in the art, alternative assumptions can be equally made depending on the communicational specifications of the communicational types being distinguished. For example, if the communicational types being distinguished specified that devices were to output binary "1" values until a handshaking is performed, then, at step 315, rather than configuring the device, as a default, to the communicational type having the lowest voltage thresholds for distinguishing between a binary "0" and a binary "1", the device could be configured, as a default to the communicational type having the highest voltage thresholds for distinguishing between a binary "0" and a binary "1".

Returning back to the present, illustrative example of distinguishing between NTDS types, if, at step 320, the voltages observed on selected inputs correspond to binary "1"s for greater than a threshold duration, then, based on the above-described expectation that binary "0"s should have been received, a determination can be made that the configuration for NTDS Type A, performed at step 315, may have been incorrect. Instead, if, at step 320, binary "1"s are being received for greater than a threshold duration with the device set to NTDS Type A, processing can proceed to step 325 and the device can be configured for a different communication type, such as, for example, NTDS Type B. By requiring that the voltages observed on selected inputs correspond to binary "1"s for greater than a threshold duration, transient fluctuations can be filtered out as noise, and need not result in communicational type reconfigurations. However, the establishing of such a threshold duration, and its duration itself, are design choices based on the relevant communicational specifications and practical considerations.

Conversely, if, at step 320, the voltages observed on selected inputs do not correspond to binary "1"s for greater than a threshold duration, then a determination can be made that the communicational type for which the device was configured at step 315 was, in fact, correct, and processing can proceed to step 350, wherein data communications according to the configured type can be exchanged between communicationally coupled devices.

Returning back to step 325, if processing proceeded to step 325, for the reasons indicated above, the device can be configured for a different communicational type, such as, for example, NTDS Type B. Processing can then proceed to step 330, where a subsequent determination can be made whether the voltages observed on selected inputs correspond to binary "1"s for greater than a threshold duration. The determination, at step 330, can be analogous to that at step 320, detailed above, and can be made for analogous reasons.

If, at step 330, it is determined that the voltages observed on selected inputs do not correspond to binary "1"s for greater than the threshold duration, then, a determination can be made that the communicational type for which the device was configured at step 325 was, in fact, correct, and processing can proceed to step 350. Conversely, if, at step 330, it is determined that the voltages observed on the selected inputs do correspond to binary "1"s for greater than the threshold duration, processing can proceed to step 335, and the device can be configured for yet another, different communicational type such as, for example, NTDS Type C or NTDS Type H. Optionally, as indicated by the dashed lines, subsequent to step 335, wherein the device is configured for NTDS Type C or NTDS Type H, an optional check can be made, at step 340, if the voltages observed on selected inputs correspond to binary "1"s for greater than a threshold duration. Also as before, if, at step 340, is determined that the voltages observed on the selected inputs do not correspond to binary "1"s for greater than the threshold duration, processing can proceed to step 350 with a determination that the communicational type for which the device is configured at step 335 was, in fact, correct. Conversely, if, at step 340, it is determined that the voltages observed on the selected inputs still correspond to binary "1"s, then a determination can be made that an error has occurred, such as illustrated by step 345.

As indicated, steps 340 and 345 can be optional as providing an additional double-check, error detection, or other like auxiliary functionality. If steps 340 and 345 are not performed, then the configuration, at step 335, for operation according to either NTDS Type C or NTDS Type H can be performed as a result of a process of elimination, performed via the checks at steps 320 and 330, wherein a determination, via those steps, that the configurations of NTDS Type A and NTDS Type B are incorrect lead to the conclusion, without the specific check at step 340, that the correct communicational type is the NTDS Type C or NTDS Type H for which the device is configured at step 335. Processing can then proceed directly to step 350, as illustrated by the optional dashed process flow proceeding directly from step 335 to step 350.

Returning back to step 350, during the exchange of data communications according to the configured type, at step 350, the outputs of the comparators illustrated in FIG. 2, for purposes of detecting a change in the communicational type, can be monitored. Thus, for example, if, at step 355, it is determined that a comparator, such as, for example, the comparator that detects both NTDS Type A and NTDS Type B communications, is outputting a digital "1", then a subsequent determination can also be made as to whether another comparator, such as, for example, the comparator that detects only NDTS Type A is also outputting a digital "1". If such a comparator is also outputting a digital "1", as determined at step 360, then processing can proceed to step 365, and the communicational device can be reconfigured to utilize NTDS Type A, unless, of course, the device was already configured to utilize NTDS Type A. In either case, processing can then return to step 350.

Conversely, if, at step 355, it is determined that the comparator that detects both NTDS Type A and NTDS Type B communications is outputting a digital "1", but it is further determined, at step 360, that another comparator, such as, for example, the comparator that detects only NDTS Type A, is outputting a digital "0", then processing can proceed to step 370 and the communicational device can be reconfigured to utilize NTDS Type B, unless the device was already configured to utilize NTDS Type B. In either case, processing can then return to step 350. If, on the other hand, at step 355 it is determined that the comparator that detects both NTDS Type A and NTDS Type B communications is outputting a digital "0", processing can proceed to optional step 375, indicated as such in FIG. 3 via dashed lines, and an optional check can be made of yet another comparator, such as, for example, the optional comparator that detects NTDS Type C or NTDS Type H communications described in detail above. If, at optional step 375, such an optional check reveals that that comparator is outputting a digital "1", then the device can be reconfigured, at step 380, to utilize NTDS Type C or NTDS Type H, unless, of course, the device was already so configured. In either case, processing can then return to step 350. Conversely, if, at step 375, the output of comparator that detects NTDS Type C or NTDS Type H is a digital "0", then processing can return to step 350.

Rather than performing the optional check at step 375, according to another aspect, the determination, at step 355, that the comparator that detects both NTDS Type A and NTDS Type B communications is outputting a digital "0" can directly trigger the configuration of the device to either NTDS Type C or NTDS Type H at step 380 since, according to such another aspect, the determination, by the referenced comparator, that the signals are not being transmitted according to NTDS Type A or NTDS Type B can lead to the conclusion that they are being transmitted according to NTDS Type C or NTDS Type H and, accordingly, the processing flow can proceed directly to step 380. As indicated previously, because certain communicational types, such as NTDS Type C and NTDS Type H, can utilize the same voltage ranges, there can be no need to differentiate between them insofar as configuring a device to use a specific one of those two communicational types.

Additionally, although illustrated as sequential evaluations, the determinations of steps 355, 360 and 375 can be performed in parallel or in an alternative order without departing from the mechanisms described. Additionally, as indicated, the steps of the exemplary flow diagram 300 can be performed by custom processing circuitry, such as the aforementioned FPGAs. In such an instance, the processing units 280 of FIG. 2 can be such FPGAs. Alternatively, or in addition, the various detections performed by the comparators 250, 260 and 270 of FIG. 2, and associated processing performed by the processing units 280, can be performed by computer-executable instructions executing on a general-purpose computing device, such as the exemplary general-purpose computing device 400 shown in FIG. 4. In such an instance, the computing device can measure an analog voltage detected on, for example, one or more handshake inputs, and can perform the above-described steps with reference to such a measured voltage, as opposed to basing such operations on the binary output of comparators. More specifically, such a computing device can execute computer-executable instructions in the form of "if, then" statements, or other analogous programming constructs, to achieve the above-described determinations. Such a computing device is illustrated with greater specificity in FIG. 4.

Figure 4:
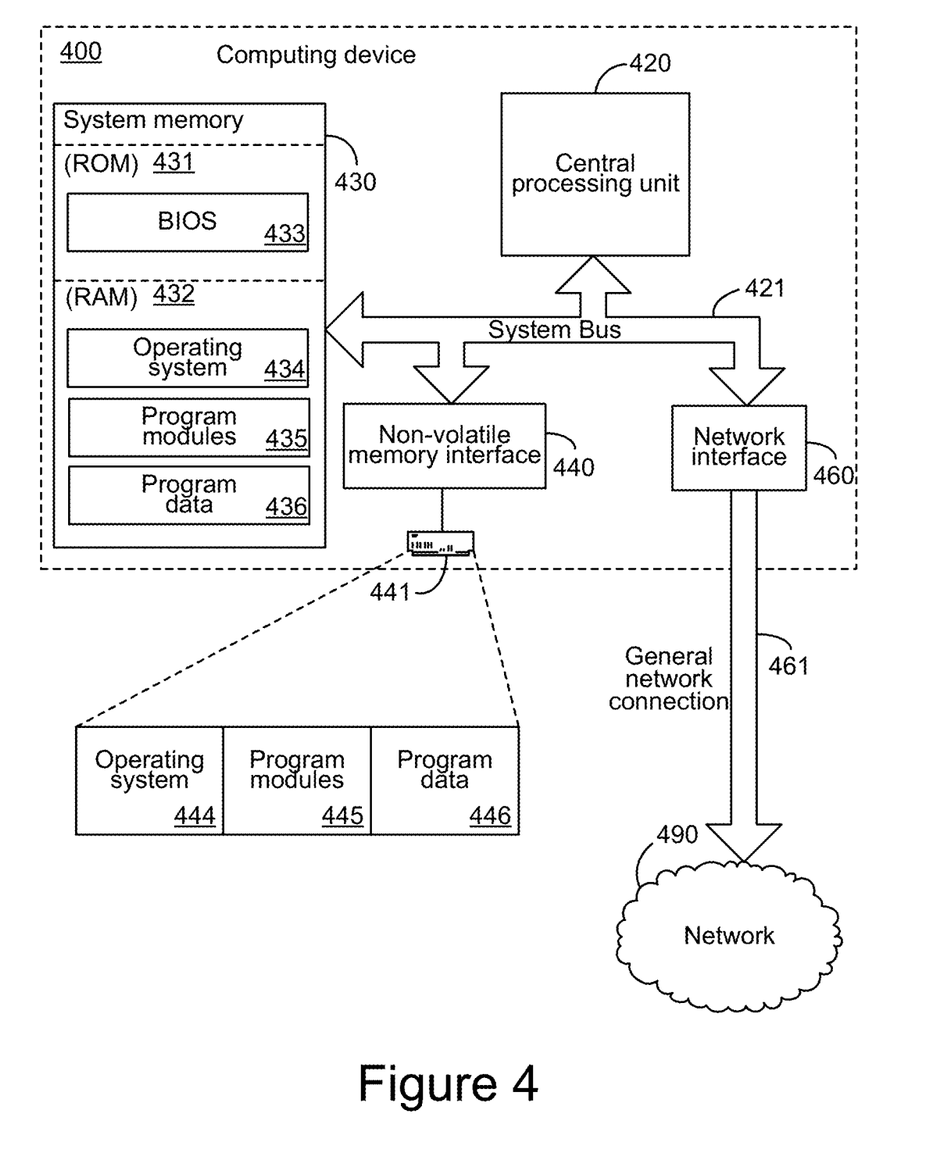
FIG. 4 is a block diagram of an exemplary computing device configured to perform an exemplary communicational type autodetection.

Turning to FIG. 4, an exemplary computing device 400 is illustrated which can perform some or all of the mechanisms and actions described above. The exemplary computing device 400 can include, but is not limited to, one or more central processing units (CPUs) 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. Depending on the specific physical implementation, one or more of the CPUs 420, the system memory 430 and other components of the computing device 400 can be physically co-located, such as on a single chip. In such a case, some or all of the system bus 421 can be nothing more than silicon pathways within a single chip structure and its illustration in FIG. 4 can be nothing more than notational convenience for the purpose of illustration.

The computing device 400 also typically includes computer readable media, which can include any available media that can be accessed by computing device 400 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 400. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer content between elements within computing device 400, such as during start-up, is typically stored in ROM 431. RAM 432 typically contains data and/or program modules that are immediately accessible to and/or presently being operated on by processing unit 420. By way of example, and not limitation, FIG. 4 illustrates operating system 434, other program modules 435, and program data 436.

The computing device 400 may also include other removable/non-removable, volatile/nonvolatile computer storage media. By way of example only, FIG. 4 illustrates a hard disk drive 441 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 441 is typically connected to the system bus 421 through a non-volatile memory interface such as interface 440.

The drives and their associated computer storage media discussed above and illustrated in FIG. 4, provide storage of computer readable instructions, data structures, program modules and other data for the computing device 400. In FIG. 4, for example, hard disk drive 441 is illustrated as storing operating system 444, other program modules 445, and program data 446. Note that these components can either be the same as or different from operating system 434, other program modules 435 and program data 436. Operating system 444, other program modules 445 and program data 446 are given different numbers hereto illustrate that, at a minimum, they are different copies.

The computing device 400 may operate in a networked environment using logical connections to one or more remote computers. The computing device 400 is illustrated as being connected to the general network connection 461 through a network interface or adapter 460, which is, in turn, connected to the system bus 421. In a networked environment, program modules depicted relative to the computing device 400, or portions or peripherals thereof, may be stored in the memory of one or more other computing devices that are communicatively coupled to the computing device 400 through the general network connection 461. It will be appreciated that the network connections shown are exemplary and other means of establishing a communications link between computing devices may be used.

Although described as a single physical device, the exemplary computing device 400 can be a virtual computing device, in which case the functionality of the above-described physical components, such as the CPU 420, the system memory 430, the network interface 460, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 400 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example, An NTDS type detection system comprising: a first comparator circuit comparing one of an EIR, ODR, EFR or IDR handshake input to a first threshold voltage, the first threshold voltage differentiating between a binary "0" according to NTDS Type B and a binary "0" according to NTDS Type A; and a second comparator circuit comparing the one of the EIR, ODR, EFR or IDR handshake input to a second threshold voltage, the second threshold voltage differentiating between a binary "0" according to both NTDS Type B and NTDS Type A and a binary "0" according to NTDS Type C and NTDS Type H.

A second example is the system of the first example, further comprising one or more processing units configured to perform steps comprising: setting a communicational type to NTDS Type A if output of the first comparator circuit is indicative of NTDS Type A; and setting the communicational type to NTDS Type B if both the output of the first comparator circuit is not indicative of NTDS Type A and if output of the second comparator circuit is indicative of NTDS Type B and NTDS Type A; wherein the outputs of the first and second comparators are connected to the one or more processing units.

A third example is the system of the second example, wherein the one or more processing units are field programmable gate arrays.

A fourth example is the system of the second example, wherein the one or more processing units are configured to perform further steps comprising: setting the communicational type to NTDS Type C or NTDS Type H if the output of the second comparator circuit is not indicative of NTDS Type B and NTDS Type A.

A fifth example is the system of the first example, further comprising: a third comparator circuit comparing the one of the EIR, ODR, EFR or IDR handshake input to a third threshold voltage, the third threshold voltage also differentiating between a binary "0" according to both NTDS Type B and NTDS Type A and a binary "0" according to NTDS Type C and NTDS Type H, the third threshold voltage being higher than the second threshold voltage.

A sixth example is the system of the fifth example, wherein the one or more processing units are configured to perform further steps comprising: setting the communicational type to NTDS Type C or NTDS Type H if output of third comparator circuit is indicative of NTDS Type C or NTDS Type H.

A seventh example is the system of the first example, further comprising one or more processing units configured to perform steps comprising: initially setting a communicational type to NTDS Type A; subsequently changing the communicational type to NTDS Type B if binary "0" values were expected on one or more of the EIR, ODR, EFR or IDR handshake inputs and binary "1" values were instead detected with the communicational type set to NTDS Type A; and subsequently changing again the communicational type to either NTDS Type C or NTDS Type H if binary "0" values were expected on one or more of the EIR, ODR, EFR or IDR handshake inputs and binary "1" values were instead detected with the communicational type set to NTDS Type B.

An eighth example is the system of the seventh example, wherein the one or more processing units are configured to perform further steps comprising: reporting an error if binary "0" values were expected on one or more of the EIR, ODR, EFR or IDR handshake inputs and binary "1" values were instead detected with the communicational type set to either NTDS Type C or NTDS Type H.

A ninth example is the system of the first example, further comprising additional comparator circuits for additional ones of the EIR, ODR, EFR or IDR handshake inputs, the additional comparator circuits also differentiating between binary "0"s of different NTDS types.

A tenth example is a communicational type detection system comprising: a first comparator circuit comparing a handshake input to a first threshold voltage, the threshold voltage differentiating between a binary "0" or binary "1" value according to a first communicational type and the binary "0" or binary "1" value according to a second communicational type; a second comparator circuit comparing the handshake input to a second threshold voltage, the second threshold voltage differentiating between the binary "0" or binary "1" value according to one of the first or the second communicational types and the binary "0" or binary "1" value according to a third communicational type; and one or more processing units to which outputs of the first and second comparator circuits are connected, the one or more processing units being configured to set a communicational type to one of the first communicational type, the second communicational type or the third communicational type based on outputs of the first and second comparator circuits.

An eleventh example is the system of the tenth example, further comprising additional comparator circuits comparing other handshake inputs to the first and second threshold voltages.

A twelfth example is the system of the tenth example, further comprising a third comparator circuit comparing the handshake input to a third threshold voltage differentiating between the binary "0" or binary "1" value according to one of the first or the second communicational types and the binary "0" or binary "1" value according to a third communicational type.

A thirteenth example is the system of the tenth example, wherein the one or more processing units are configured to perform further steps comprising: initially setting a communicational type to the first communicational type; and subsequently changing the communicational type to the second communicational type if one type of binary value was expected on one or more handshake inputs and a different type of binary value was, instead, detected with the communicational type set to the first communicational type.

A fourteenth example is the system of the tenth example, wherein the first communicational type is one of NTDS Type A, NTDS Type B, NTDS Type C or NTDS Type H and the second communicational type is another of NTDS Type A, NTDS Type B, NTDS Type C or NTDS Type H.

A fifteenth example is one or more computer-readable storage media comprising computer-executable instructions for controlling a communicational type setting on a device, the computer-executable instructions, when executed by one or more processing units of a computing device, causing the computing device to: detect a voltage level at a handshake input; compare the detected voltage level to a first threshold voltage level that differentiates between a binary "0" or binary "1" value according to a first communicational type and the binary "0" or binary "1" value according to a second communicational type; and set a communicational type to one of the first communicational type or the second communicational type based on the comparing.

A sixteenth example is the one or more computer-readable storage media of the fifteenth example, comprising further computer-executable instructions, which, when executed by the one or more processing units, cause the computing device to compare the detected voltage level to a second threshold level that differentiates between the binary "0" or binary "1" value according to one of the first or the second communicational types and the binary "0" or binary "1" value according to a third communicational type; wherein the setting of the communicational type is based on the comparing the detected voltage level to both the first threshold voltage level and the second threshold voltage level.

A seventeenth example is the one or more computer-readable storage media of the fifteenth example, comprising further computer-executable instructions, which, when executed by the one or more processing units, cause the computing device to: detect voltage levels at multiple different handshake inputs; and compare each individual detected voltage level to the first threshold voltage level; wherein the setting the communicational type is based on the comparing of each individual detected voltage level to the first threshold voltage level.

An eighteenth example is the one or more computer-readable storage media of the fifteenth example, comprising further computer-executable instructions, which, when executed by the one or more processing units, cause the computing device to: initially set a communicational type to the first communicational type; and subsequently change the communicational type to the second communicational type if one type of binary value was expected on one or more handshake inputs and a different type of binary value was, instead, detected with the communicational type set to the first communicational type.

A nineteenth example is the one or more computer-readable storage media of the fifteenth example, comprising further computer-executable instructions, which, when executed by the one or more processing units, cause the computing device to: subsequently change again the communicational type to a third communicational type if the one type of binary value was expected on the one or more handshake inputs and the different type of binary value was, instead, still detected even with the communicational type set to the second communicational type.

A twentieth example is the one or more computer-readable storage media of the fifteenth example, wherein the first communicational type is one of NTDS Type A, NTDS Type B, NTDS Type C or NTDS Type H and the second communicational type is another of NTDS Type A, NTDS Type B, NTDS Type C or NTDS Type H.

As can be seen from the above descriptions, mechanisms for automatically detecting and setting a communicational type have been presented. In view of the many possible variations of the subject matter described herein, we claim as our invention all such embodiments as may come within the scope of the following claims and equivalents thereto.

We claim:

1. A communicational type detection system comprising:
    a first comparator circuit comparing one or more voltages of a communication of an unspecified communicational type, received from a remote device, to a first threshold voltage, the first threshold voltage differentiating between: (1) communications conforming to a first communicational type and (2) communications conforming to a second communicational type, wherein voltages indicative of binary values according to the first communicational type differ from voltages indicative of binary values according to the second communicational type; and one or more processing units to which output of the first comparator circuit is connected, the one or more processing units being configured to set a communicational type, that will be utilized by a first communicational device to communicate with the remote device, to one of the first communicational type or the second communicational type based on the output of the first comparator circuit;

wherein the first communicational device can utilize one of multiple communicational types to communicate with the remote device, the first communicational device's communicational type settings being controllable by the one or more processing units, the communication of the communicational type is one of an External interrupt request (EIR), Output data request (ODR), External function request (EFR) or Input data request (IDR) handshake input; and the first threshold voltage differentiates between a binary "0" according to Naval Tactical Data System (NTDS) Type B and a binary "0" according to NTDS Type A.

2. The system of claim 1, wherein the communication of the communicational type is received on a first set of one or more wires, the system further comprising additional comparator circuits comparing communications received on other sets of one or more wires to the first threshold voltage.

3. The system of claim 1, wherein the one or more processing units are configured to perform further steps comprising:

initially setting a communicational type to the first communicational type; and subsequently changing the communicational type to the second communicational type if one type of binary value was expected and a different type of binary value was, instead, detected with the communicational type set to the first communicational type.

4. The system of claim 1, wherein the first communicational type is one of NTDS Type A, NTDS Type B, NTDS Type C or NTDS Type H and the second communicational type is another of NTDS Type A, NTDS Type B, NTDS Type C or NTDS Type H.

5. The system of claim 1, further comprising a communicational type autodetector device that is physically separate from the first communication device, the communicational type autodetector device comprising the first comparator circuit and at least some of the one or more processing units.

6. The system of claim 5, wherein communicational cabling from the remote device is coupled to the communicational type autodetector device and the communicational type autodetector device is further coupled to the first communication device such that communications between the remote device and the first communication device pass through the communicational type autodetector device.

7. The system of claim 1, wherein the one or more processing units are field programmable gate arrays.

8. The system of claim 1, wherein the one or more processing units are further configured to report an error if binary "0" values were expected on the handshake input and binary "1" values were instead detected with the communicational type set to either NTDS Type C or NTDS Type H.

9. A communicational type detection system comprising:

a first comparator circuit comparing one or more voltages of a communication of an communicational type, received from a remote device, to a first threshold voltage, the first threshold voltage differentiating between: (1) communications conforming to a first communicational type and (2) communications conforming to a second communicational type, wherein voltages indicative of binary values according to the first communicational type differ from voltages indicative of binary values according to the second communicational type; and one or more processing units to which output of the first comparator circuit is connected, the one or more processing units being configured to set a communicational type, that will be utilized by a first communicational device to communicate with the remote device, to one of the first communicational type or the second communicational type based on the output of the first comparator circuit;

wherein the first communicational device can utilize one of multiple communicational types to communicate with the remote device, the first communicational device's communicational type settings being controllable by the one or more processing units, and further comprising a second comparator circuit comparing the one or more voltages of the communication of the communicational type to a second threshold voltage, the second threshold voltage differentiating between: (1) communications conforming to one of the first or the second communicational types and (2) communications conforming to a third communicational type, wherein voltages indicative of binary values according to the third communicational type differ from at least one of: the voltages indicative of the binary values according to the first communicational type or the voltages indicative of the binary values according to the second communicational type, the communication of the communicational type is one of an External interrupt request (EIR), Output data request (ODR), External function request (EFR) or Input data request (IDR) handshake input;

the first threshold voltage differentiates between a binary "0" according to Naval Tactical Data System (NTDS) Type B and a binary "0" according to NTDS Type A; and the second threshold voltage differentiating between a binary "0" according to both NTDS Type B and NTDS Type A and a binary "0" according to NTDS Type C and NTDS Type H.

10. The system of claim 9, wherein the one or more processing units are configured to set the communicational type to NTDS Type B if both the output of the first comparator circuit is not indicative of NTDS Type A and if output of the second comparator circuit is indicative of NTDS Type B and NTDS Type A.

11. The system of claim 10, wherein the one or more processing units are further configured to set the communicational type to NTDS Type C or NTDS Type H if the output of the second comparator circuit is not indicative of NTDS Type B and NTDS Type A.

* * * * *